US010190718B2

(12) United States Patent
Weinstein et al.

(10) Patent No.: US 10,190,718 B2
(45) Date of Patent: Jan. 29, 2019

(54) ACCUMULATOR ASSEMBLY, PUMP SYSTEM HAVING ACCUMULATOR ASSEMBLY, AND METHOD

(71) Applicants: Jeremy L. Weinstein, Tomball, TX (US); Bryan Scott Lambert, The Woodlands, TX (US)

(72) Inventors: Jeremy L. Weinstein, Tomball, TX (US); Bryan Scott Lambert, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 223 days.

(21) Appl. No.: 15/176,290

(22) Filed: Jun. 8, 2016

(65) Prior Publication Data
US 2017/0356586 A1 Dec. 14, 2017

(51) Int. Cl.
*E21B 43/26* (2006.01)
*F16L 55/055* (2006.01)
*G05D 16/20* (2006.01)
*E21B 43/267* (2006.01)

(52) U.S. Cl.
CPC ........ *F16L 55/055* (2013.01); *G05D 16/2013* (2013.01); *E21B 43/26* (2013.01); *E21B 43/267* (2013.01)

(58) Field of Classification Search
CPC ....... E21B 43/26; E21B 43/261; E21B 43/267
USPC .................. 166/307, 275, 308.1, 90.1, 75.15
See application file for complete search history.

(56) References Cited

U.S. PATENT DOCUMENTS

| 3,434,430 | A | | 3/1969 | Berman et al. |
| 3,560,053 | A | * | 2/1971 | Ortloff .................. E21B 43/267 |
| | | | | 406/109 |
| 3,579,984 | A | | 5/1971 | Rohde |
| 3,794,076 | A | | 2/1974 | Chouings |
| 3,882,678 | A | | 5/1975 | Fassbender |
| 4,082,367 | A | | 4/1978 | Kocsanyi et al. |
| 4,145,886 | A | | 3/1979 | Haigh |
| 4,242,867 | A | | 1/1981 | Belart |

(Continued)

FOREIGN PATENT DOCUMENTS

| FR | 2278963 A1 | 2/1976 |
| WO | 2010101668 A1 | 9/2010 |

OTHER PUBLICATIONS

International Search Report for International Application No. PCT/US2017/034639; dated Aug. 29, 2017; 3 pages.

(Continued)

*Primary Examiner* — Brad Harcourt
*Assistant Examiner* — David Carroll
(74) *Attorney, Agent, or Firm* — Cantor Colburn LLP

(57) ABSTRACT

An accumulator assembly for a pump system at a well site is arranged to fluidically connect to a flow line between a blender and a fracturing pump of the pump system. The accumulator assembly includes a pressurizable tank configured to contain pressurized fluid; and, a control valve fluidically connected between a discharge end of the tank and the flow line. The control valve opens and fluidically connects the tank to the flow line when a pressure on the flow line is less than a target pressure, and the control valve closes and fluidically blocks communication between the tank and the flow line when the pressure on the flow line is greater than or substantially same as the target pressure.

20 Claims, 4 Drawing Sheets

(56) References Cited

U.S. PATENT DOCUMENTS

| | | |
|---|---|---|
| 4,303,089 A | 12/1981 | Gage et al. |
| 4,510,800 A | 4/1985 | Prior |
| 4,574,904 A | 3/1986 | Goode |
| 8,529,230 B1 | 9/2013 | Colley, III et al. |
| 2004/0007392 A1 | 1/2004 | Judge et al. |
| 2009/0120635 A1* | 5/2009 | Neal .................. E21B 21/003 166/250.15 |
| 2012/0160502 A1 | 6/2012 | Pettigrew |
| 2013/0036728 A1 | 2/2013 | Billaud et al. |
| 2013/0233560 A1* | 9/2013 | Davidson .............. E21B 43/26 166/308.1 |
| 2014/0277772 A1 | 9/2014 | Lopez et al. |

OTHER PUBLICATIONS

Written Opinion of the International Search Report for International Application No. PCT/US2017/034639; dated Aug. 29, 2017; 10 pages.

"Understanding Hydraulic Fracturing" Brochure; Canadian Society for Unconventional Gas; http://www.csur.com/images/CSUG_publications/CSUG_HydraulicFrac_Brochure.pdf; May 6, 2016; 24 pages.

* cited by examiner

ACCUMULATOR ASSEMBLY, PUMP SYSTEM HAVING ACCUMULATOR ASSEMBLY, AND METHOD

BACKGROUND

In the drilling and completion industry, the formation of boreholes for the purpose of production or injection of fluid is common. The boreholes are used for exploration or extraction of natural resources such as hydrocarbons, oil, gas, water, and alternatively for CO2 sequestration. To increase the production from a borehole, the production zone can be fractured to allow the formation fluids to flow more freely from the formation to the borehole. The fracturing operation includes pumping fluids at high pressure towards the formation wall to form formation fractures. To retain the fractures in an open condition after fracturing pressure is removed, the fractures must be physically propped open, and therefore the fracturing fluids commonly include solid granular materials, such as sand, generally referred to as proppants.

Crankshaft driven positive displacement pumps are used to pump the fracturing fluids at the high pressures required for fracturing. The pressure required for hydraulic fracturing of a formation, for example, often requires fracturing fluid to be pumped at pressures of 10,000 to 15,000 psi in order to create a fracture in the formation. The pumps include a fluid end and a power end. The fluid end includes a number of plungers driven by a crankshaft toward and away from a chamber in order to affect a high or low pressure on the chamber. The fluid end receives relatively low pressure fluid, and pressurizes the fluid to provide higher pressurized fracturing fluid at the required pressure for fracturing within the borehole. The power end includes or is attached to a pump powering mechanism also known as a prime mover, commonly an electric motor, which connects to a pinion shaft to drive the power end.

The art would be receptive to improvements in a high pressure fracturing pump, particularly with respect to improving pump life.

BRIEF DESCRIPTION

An accumulator assembly for a pump system at a well site is arranged to fluidically connect to a flow line between a blender and a fracturing pump of the pump system. The accumulator assembly includes a pressurizable tank configured to contain pressurized fluid; and, a control valve fluidically connected between a discharge end of the tank and the flow line. The control valve opens and fluidically connects the tank to the flow line when a pressure on the flow line is less than a target pressure, and the control valve closes and fluidically blocks communication between the tank and the flow line when the pressure on the flow line is greater than or substantially same as the target pressure.

A pump system for use at a well site includes: a blender; a fracturing pump; a flow line configured to transfer fluidic materials from the blender to the fracturing pump; and, an accumulator assembly arranged to fluidically connect to the flow line between the blender and the fracturing pump. The accumulator assembly includes: a pressurizable tank configured to contain pressurized fluid; and, a control valve fluidically connected between a discharge end of the tank and the flow line. The control valve opens and fluidically connects the tank to the flow line when a pressure on the flow line is less than a target pressure, and the control valve closes and fluidically blocks communication between the tank and the flow line when the pressure on the flow line is greater than or substantially same as the target pressure.

A method of protecting a fluid end of a fracturing pump from cavitation includes: transferring fluidic materials from a blender to a fracturing pump along a flow line; fluidically connecting an accumulator assembly to the flow line between the blender and the fracturing pump, the accumulator assembly including a pressurizable tank configured to contain pressurized fluid, and a control valve fluidically connected between a discharge end of the tank and the flow line; monitoring pressure on the flow line; opening the control valve to fluidically connect the tank to the flow line when a pressure on the flow line is less than a target pressure; and, closing the control valve to fluidically block communication between the tank and the flow line when the pressure on the flow line is greater than or substantially same as the target pressure.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
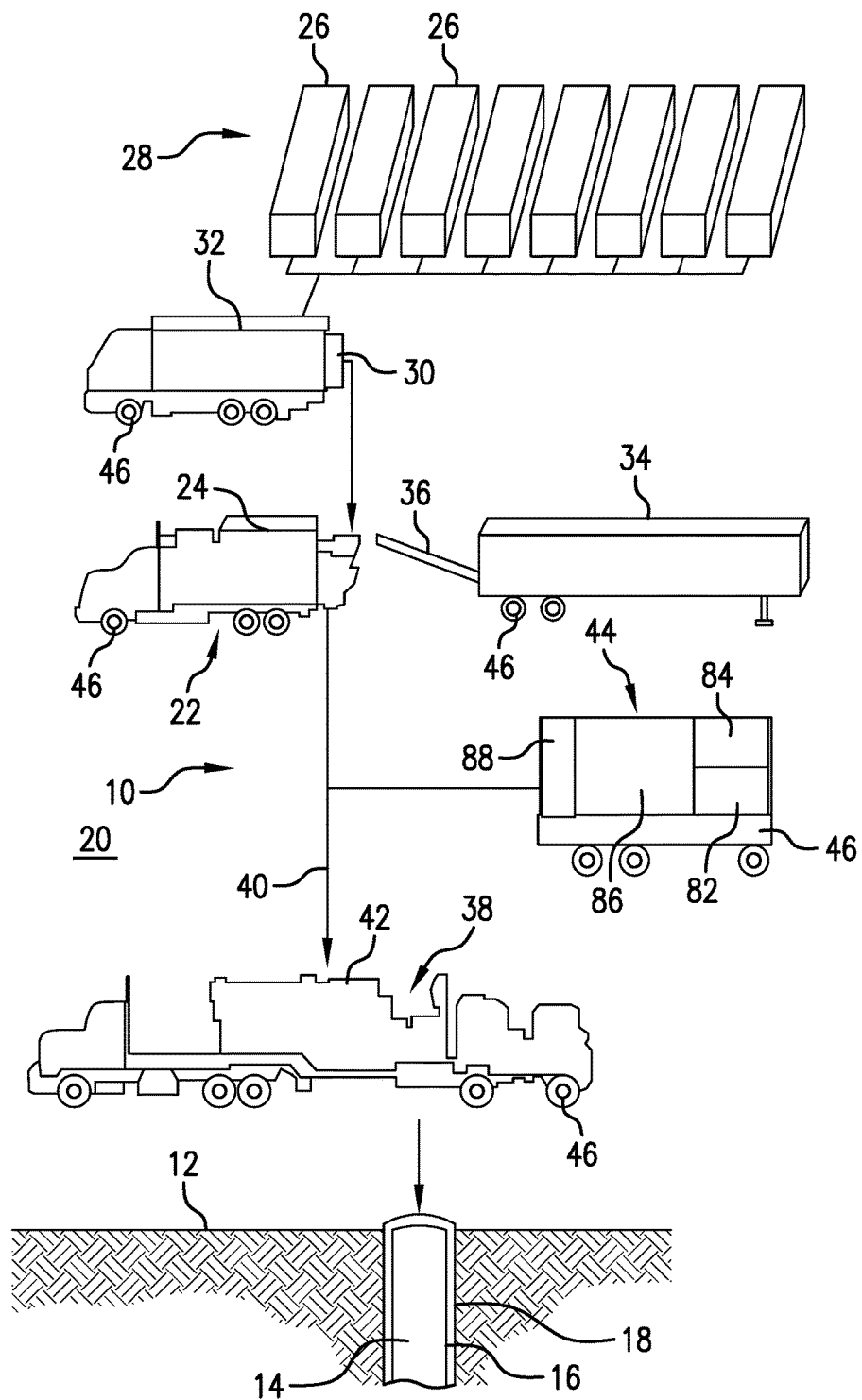
FIG. 1 depicts a schematic view of an embodiment of a pump system usable for a downhole fracturing operation at a wellsite.

With reference to FIG. 1, one embodiment of a pump system 10 for pumping a fluid from a surface 12 to a borehole 14, such as a hydraulic fracturing fluid usable in a hydraulic fracturing process, is schematically depicted for use at a well site 20. The borehole 14 may be cased or uncased, or include any other tubular 16 provided with perforations or openings for fracturing fluid to pass towards the formation wall 18. The pump system 10 includes a blender 22. The blender 22 includes, in part, a blender tank or tub 24 for blending components of the fracturing fluid. Components of the fracturing fluid may include a base fluid (such as water), proppant, and various other additives to form a slurry of the hydraulic fracturing fluid. The base fluid may be stored in one or more water tanks 26 in a fluid supply 28. In one embodiment, prior to blending, the base fluid may be passed through a hydration system 30, which combines the base fluid with additives for a sufficient amount of residence time within a hydration tank 32 of the hydration system 30 to form a gel. The gel may then be directed to the blender 22 for combining with proppant from a proppant supply 34, which may include a feeder 36. The fracturing fluid is pumped from the blender 22 to a fracturing pump assembly 38 along flow line 40. The fracturing pump assembly 38 may include one or more fracturing pumps 42

(also known as "frac" pumps), as will be further described below. While only one fracturing pump assembly 38 is depicted, a manifold may provide the fracturing fluid to multiple fracturing pump assemblies 38. The hydraulic fracturing fluid is then deliverable into the borehole 14 at high pressures by the one or more fracturing pump assemblies 38 The pump system 10 further includes an accumulator assembly 44 configured to fluidically connect to the flow line 40, as will be further described below.

Any or all of the components of the pump system 10, including the blender 22, hydration system 30, proppant supply 34, fluid supply 28, accumulator assembly 44, and fracturing pump assembly 38 may be provided on trailer beds, trucks, or other movable/wheeled platform or transportable surface 46 to assist in delivery of the components to the well site 20, and to enable such components to be reconfigured as needed at the wellsite 20, and quickly removed from the well site 20 when the process is completed. Alternatively, in an embodiment where the pump system 10 is utilized for an offshore well, the components may be positioned on a suitable fracturing and stimulation vessel (not shown).

Figure 2:
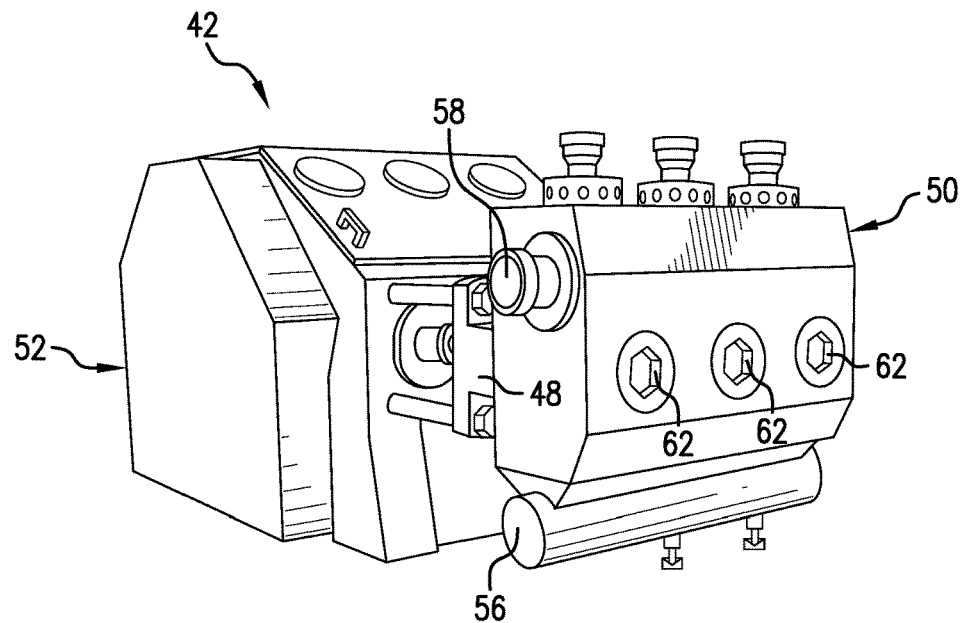
FIG. 2 depicts a perspective view of a high pressure fracturing pump according to the prior art.
Figure 3:
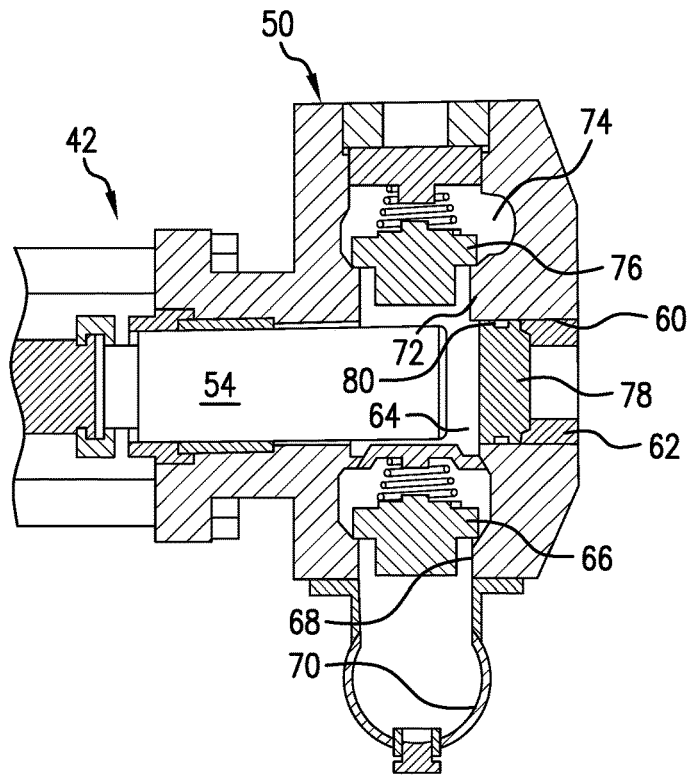
FIG. 3 depicts a sectional view of a high pressure fracturing pump according to the prior art.

FIGS. 2 and 3 illustrate one embodiment of a high pressure fracturing pump 42 that may be employed within the fracturing pump assembly 38 in the pump system 10. While one embodiment of a fracturing pump 42 is illustrated, it should be understood that other commercially available fracturing pumps 42 may be incorporated in the pump system 10, and may benefit from the process described herein. The illustrated fracturing pump 42 is a triplex pump having three reciprocating pumping units mounted in a housing of the fluid end 50 and powered by power end 52 using reciprocating plungers 54. Fluid enters fluid end 50 through an inlet 56 and is pumped out through an outlet 58. Access to internal components of fluid end 50 is provided by access bores 60 having covers 62. Pump chamber 64 has a spring loaded one-way intake valve 66 mounted in an intake port 68 in fluid communication with fluid inlet 56 via a manifolding chamber 70. Fluid is drawn into pump chamber 64 through pump inlet 56, manifolding chamber 70, and intake port 68 as plunger 54 withdraws from pump chamber 64. Fluid then is pumped out of chamber 64, and through discharge port 72, manifolding chamber 74, and pump outlet 58, as plunger 54 enters chamber 64 and pushes discharge valve 76. Suction valve cover 78 and seal 80 prevent fluid from leaking out of chamber 64 through the access bore 60. Due to the pressures required for a hydraulic fracturing operation and the abrasiveness of the hydraulic fracturing fluid, the fracturing pump 42 may incorporate some wear elements that can be replaced periodically, such as through the access bores 60.

Further, when pressure within the fracturing pumps 42 drop below a minimum pressure on the inlet 56, which may occur as a result of disruption in pressure due to operation of blender 22, the pumps cavitate. Cavitation can cause microscopic damage to the fluid end 50, including areas of the fluid end 50 not easily replaceable by wear elements, such as chamber surfaces. Cavitation can thus lead to reduced fluid end life, requiring replacement of the fluid end 50. Although intermittent losses of charge pressure are usually only for a short duration, and cavitation is halted when the blender 22 regains adequate pressure, repeated cavitation can eventually require fluid end replacement of the fracturing pump 42.

To at least substantially prevent issues of cavitation within the pump 42 and thus extend life of the fluid end 50, the accumulator assembly 44 is added to the pump system 10 as shown in FIG. 1. The accumulator assembly 44 is fluidically connected to the flow line 40 connecting the blender 22 to the pump 42. The accumulator assembly 44 may include an accumulator assembly pump 82, an engine 84 to run the pump 82, a pressurizable tank 86, and valving 88. If the tank 86 is already pressurized, and is of sufficient size to provide an adequate quantity of pressurized fluid as will be further described below, then the accumulator assembly 44 may, in an alternative embodiment, not include the accumulator assembly pump 82 and engine 84. However, the inclusion of the pump 82 extends the useable capacity of the accumulator assembly 44. Components of the accumulator assembly 44 may all be positioned on a same transportable surface (such as a trailer) 46 so the accumulator assembly 44 may be moved as a unit and modularly incorporated into the pump system 10. The tank 86 may be simply filled with fluid, such as water, from a fluid supply. The tank 86 may share the fluid supply 28. Alternatively, the tank 86 may be pre-filled with fluid, such as the same base fluid used in the fracturing fluid (such as a viscosified fluid) provided by the blender 22 before the operation (such as prior to the addition of proppant to the blender 22). The fluid in the tank 86 is pressurized. For example, in an embodiment where maintaining at least approximately 70 psi at the suction inlet 56 of the fracturing pump 42 is required to prevent cavitation of the fluid end 50, the tank 86 may be pressurized to approximately 100 psi. The tank 86 may further be designed to hold enough fluid to allow the fracturing pumps 42 to continue operating uninterrupted for a predetermined amount of time that might be typically required for the blender 22 to reprime and continue to deliver adequate suction pressure. For example, the predetermined amount of time may be approximately one minute, although different time spans can be accommodated using different size tanks 86 and/or pressures. Although the size of the tank 86 may vary depending on the fracturing pump 42 and hydraulic fracturing operation to be completed, in one embodiment the tank 86 may be an ISO tank with dimensions of approximately 8 feet in diameter and approximately 15 feet in length and having approximately a 100 bbl capacity. The valving 88, as described further below, controls release of the fluid from the accumulator assembly tank 86 into the flow line 40 as needed to prevent cavitation of the pump 42 and extend the life of the fluid end 50.

Figure 4:
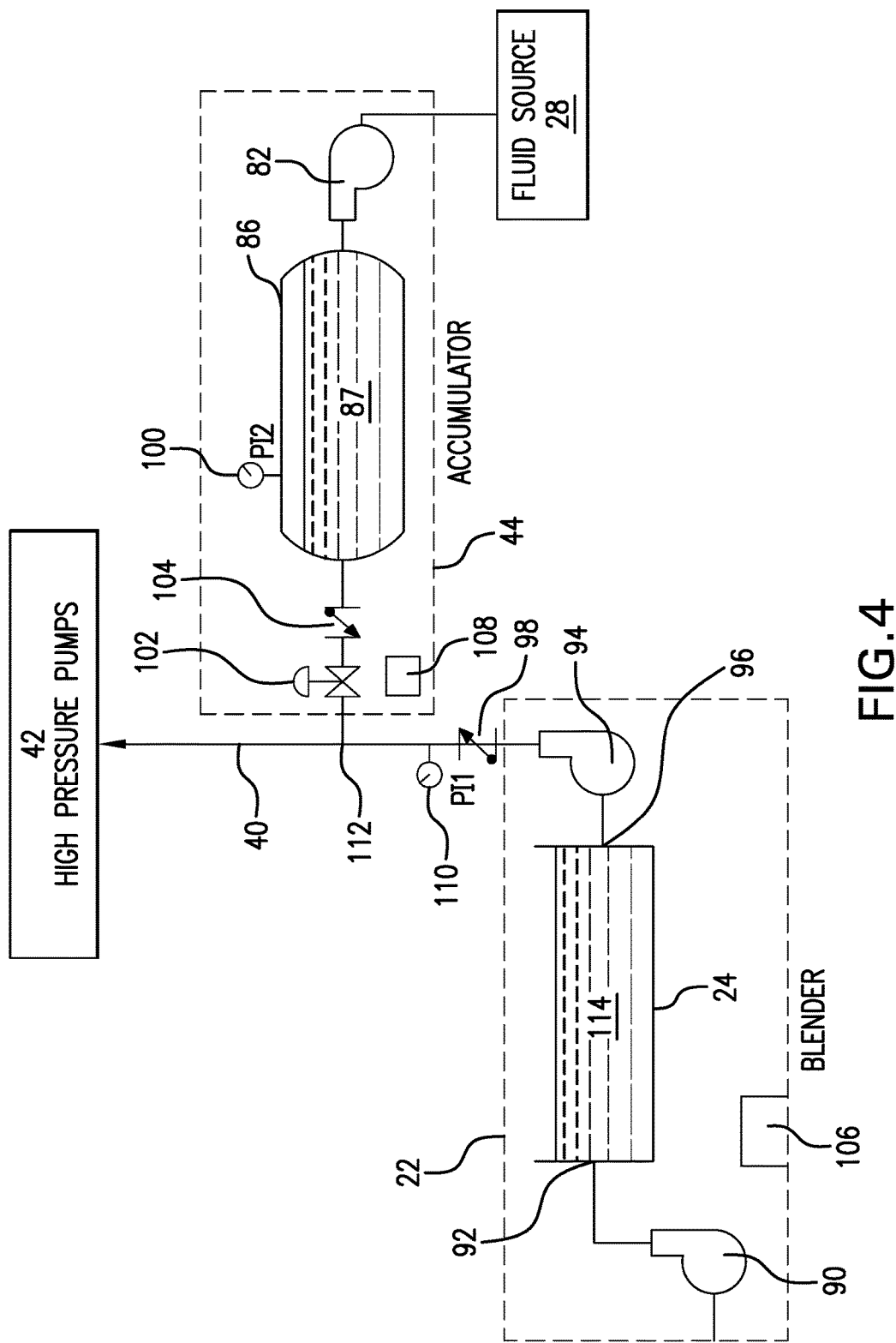
FIG. 4 depicts a schematic view of an embodiment of portions of the pump system including one embodiment of an accumulator assembly; and, FIG. 5 depicts a schematic view of another embodiment of portions of the pump system including one embodiment of an accumulator assembly.

FIG. 4 depicts one embodiment of portions of the pump system 10 including one embodiment of the accumulator assembly 44. The blender 22 is schematically illustrated to show the tub 24, a first pump 90 positioned prior to (upstream of) the tub 24 to direct fluidic materials from the fluid supply 28 and/or the hydration assembly 30 to the blender tub inlet 92. As shown in FIG. 1, proppant may further be deposited within the tub 24, as well as other materials and additives. The first pump 90 may assist in blending the ingredients deposited into the blender tub 24. A second pump 94 of the blender 22 is positioned downstream of the tub 24, and delivers blended fluid from the outlet 96 of the tub 24 to the high pressure fracturing pump 42 via the line 40. A check valve 98 may be provided on the line 40 to allow fluid to move in a direction towards the fracturing pump 42, and prevent fluid from moving back towards the second pump 94. Thus, the check valve 98 assures the direction of fluid flow is correct. Prior to performing a fracturing job, the tank 86 of the accumulator assembly 44 would be pressurized with fluid 87, such as by using the accumulator pump 82, which may be a centrifugal pump. The pressure in the tank 86 may be monitored by pressure indicator PI2 100. When suction pressure from the second pump 94 drops the pressure on flow line 40 below a predetermined target pressure, such as, but not limited to, approximately 70 psi, the control valve 102 opens to allow pressurized fluid 87 from the tank 86 to supply the fracturing pump 42. A check valve 104 may be provided in the accumulator assembly 44 to allow the pressurized fluid 87 in the tank 86 to flow through the opened control valve 102 and to the flow line 40 and the fracturing pump(s) 42, while preventing flow from returning to the tank 86. In one embodiment, when the control valve 102 opens, the pump 82 will turn on to continue to supply fluid at the required pressure until pressure exiting the blender 22 from the second pump 94 is restored. A system 106 on the blender 22 may automatically control the control valve 102, or alternatively a control system 108 to control operation of the control valve 102 may be separate from the blender 22. In either case, the control valve 102 will close automatically when pressure on flow line 40, as detected by pressure indicator PI1 110 from the blender 22 is re-established. The pressure indicator 110 is positioned to detect fluid pressure on the flow line 40 between the second pump 94 and the fluidic connection 112 of the accumulator assembly 44 to the flow line 40. In one embodiment, the control valve 102 may be used at the fluidic connection 112 such that flow through the flow line 40 either passes from the second pump 94 or from the tank 86.

A method of operating the pump system 10 includes, under normal conditions, using the first pump 90 in the blender 22 to provide fluid 114 to the blender tub 24. There may be a computerized system 106 that maintains the level of fluid 114 in the tub 24 constant. The second pump 94 at the discharge end of the blender 22 provides pressure to the high pressure fracturing pump 42 along flow line 40. The method further includes monitoring the flow line 40 with pressure indicator PI1 110. The pressure indicator 110 may indicate that the pressure on the flow line 40 is lower than the target pressure required to keep damage from occurring in the fracturing pump 42. This might happen for a variety of reasons, for example an operator error may occur, or there may be a failure of a component on the blender 22. The method further includes preventing the pressure of the flow line 40 that feeds the fracturing pump 42 to drop below the target pressure, to prevent damage to the fracturing pump 42. The control valve 102 has feedback tied to the first pressure indicator PI1 110 on the flow line 40, and when the first pressure drops below the target pressure, the control valve 102 will automatically open, allowing the accumulator assembly 44 to provide the higher pressure fluid 87 from the tank 86 to the flow line 40 and to the fracturing pump 42. Maintaining line pressure via the accumulator assembly 44 will occur until the control valve 102 closes in response to an indication from the pressure indicator 110 that the first pressure P1 on the line 40 is at or greater than the target pressure. Thus, this method allows the blender 22 time to reprime without damaging the fracturing pump 42 due to loss of fluid pressure. While the accumulator assembly 44 is providing fluid 87 to flow line 40, the accumulator pump 82 may continue to maintain the pressure in the accumulator tank 86, or, depending on the brevity of the occurrence and depending on whether or not there is sufficient volume in the accumulator tank 86, the accumulator pump 82 may not need to maintain pressure in the accumulator tank 86. The hydraulic fracturing fluid 114 and fluid 87 from the tank 86 are used as process fluids which are pushed through the system 10. These fluids 114, 87 are not working fluids in the sense that they are not used as a power fluid or to provide a motive force to an engine, but are instead employed for a purpose outside of the system 10, in particular for depositing within borehole 14.

Figure 5:
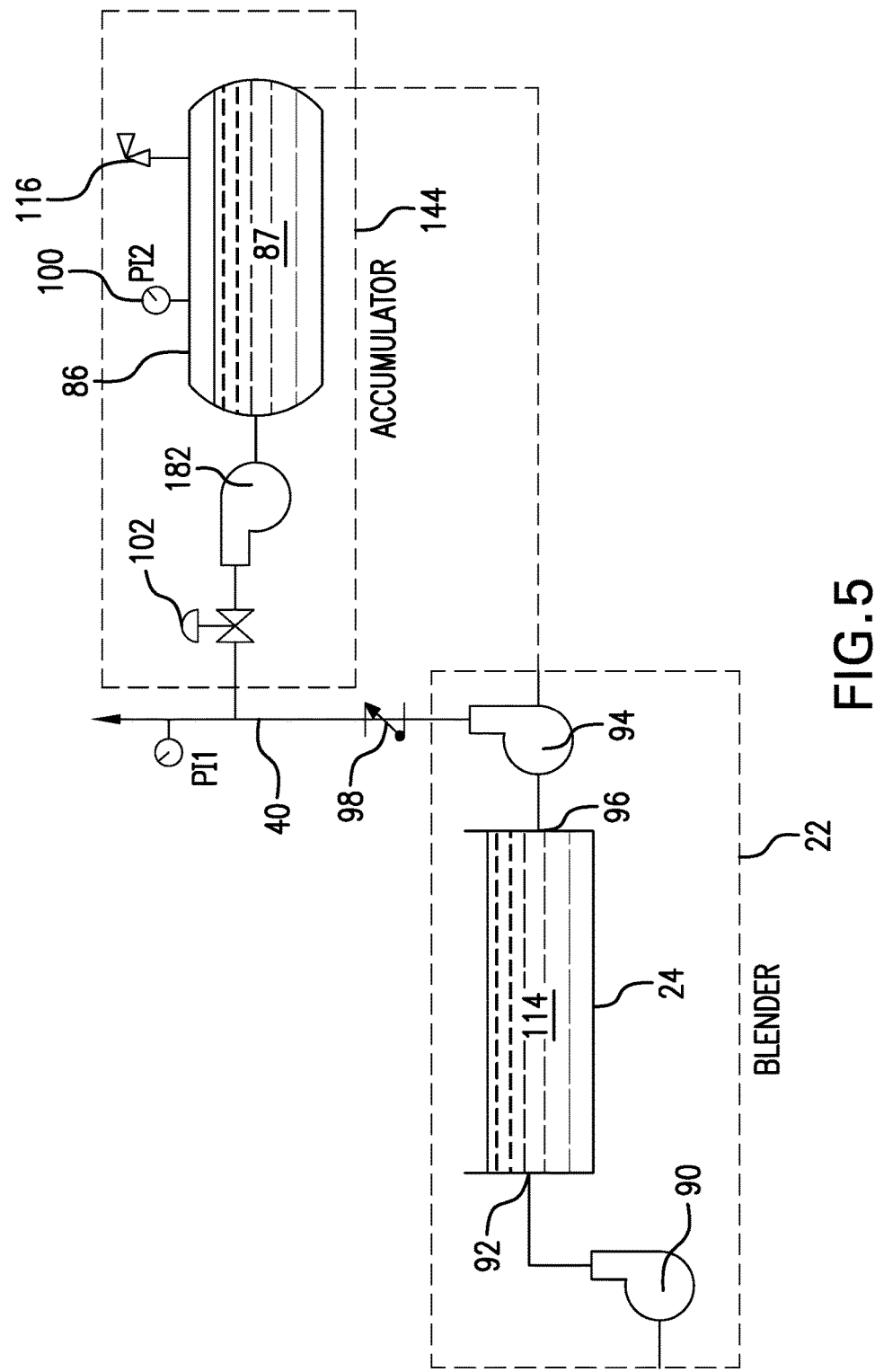

FIG. 5 depicts another embodiment of the accumulator assembly 144 for the pump system 10. Although substantially the same as the accumulator assembly 44 shown in FIG. 4, the pump 182 of the accumulator assembly 144 of FIG. 5 is provided at the discharge end of the tank 86. The tank 86 may be initially charged by the pump 94 of the blender 22 during the pad (where fluid only and not proppant is delivered), or by the fluid supply 28 or other fluid source, to provide pressurized fluid 87 within the tank 86. A pressure relief valve 116 may be included on the tank 86 to protect the tank 86 from damage that might otherwise occur due to over-pressurization. The pump 182 at the discharge of the tank 86 is not connected to a supplemental fluid source. If the control valve 102 is capable of closing quickly enough when pressure from blender 22 to line 40 is re-established, then a check valve 104 (FIG. 4) may not be required between the control valve 102 and the tank 86, however, a check valve 104 may be provided as a fail-safe.

The accumulator assembly 44 (or 144) thus includes a pressurized tank 86 of fluid 87 to maintain pressure at the fracturing pump 42 or pumps 42 as needed while the blender 22 reprimes, and thus provides emergency fluid in the case of loss of prime. After the blender 22 reprimes, pressure on the flow line 40 from the blender 22 will close the control valve 102 so as to continue to deliver hydraulic fracturing fluid slurry to the fracturing pump(s) 42. This could potentially reduce the number of instances of pump cavitation and thereby reduce the number of replacement fluid ends 50 purchased.

Set forth below are some embodiments of the foregoing disclosure:

Embodiment 1

An accumulator assembly for a pump system at a well site, the accumulator assembly arranged to fluidically connect to a flow line between a blender and a fracturing pump of the pump system, the accumulator assembly comprising: a pressurizable tank configured to contain pressurized fluid; and, a control valve fluidically connected between a discharge end of the tank and the flow line; wherein the control valve opens and fluidically connects the tank to the flow line when a pressure on the flow line is less than a target pressure, and the control valve closes and fluidically blocks communication between the tank and the flow line when the pressure on the flow line is greater than or substantially same as the target pressure.

Embodiment 2

The accumulator assembly of any of the preceding embodiments, further comprising a transportable surface arranged to carry the tank and the control valve together as a unit, the accumulator assembly movable with respect to a remainder of the pump system on the transportable surface.

Embodiment 3

The accumulator assembly of any of the preceding embodiments, wherein the transportable surface is a trailer bed.

Embodiment 4

The accumulator assembly of any of the preceding embodiments, further comprising an accumulator assembly pump fluidically connected to the tank, and an engine to operate the accumulator assembly pump, the accumulator assembly pump and the engine additionally disposed on the trailer bed.

Embodiment 5

The accumulator assembly of any of the preceding embodiments, further comprising an accumulator assembly pump fluidically connected to the tank, and an engine to operate the accumulator assembly pump.

Embodiment 6

The accumulator assembly of any of the preceding embodiments, further comprising an accumulator assembly pump fluidically connected to the tank, wherein the accumulator assembly pump is arranged to pressurize the tank.

Embodiment 7

The accumulator assembly of any of the preceding embodiments, wherein the accumulator assembly pump is configured to connect to the blender as a fluid source to pressurize the tank with the pressurized fluid.

Embodiment 8

The accumulator assembly of any of the preceding embodiments, further comprising a check valve between the control valve and the tank, wherein the check valve only permits flow in a direction from the tank to the control valve.

Embodiment 9

The accumulator assembly of any of the preceding embodiments, further comprising an accumulator assembly pump fluidically connected to the tank, wherein the accumulator assembly pump is arranged at a discharge end of the tank, and disposed between the tank and the control valve.

Embodiment 10

A pump system for use at a well site, the pump system comprising: a blender; a fracturing pump; a flow line configured to transfer fluidic materials from the blender to the fracturing pump; and, an accumulator assembly arranged to fluidically connect to the flow line between the blender and the fracturing pump, the accumulator assembly comprising: a pressurizable tank configured to contain pressurized fluid; and, a control valve fluidically connected between a discharge end of the tank and the flow line; wherein the control valve opens and fluidically connects the tank to the flow line when a pressure on the flow line is less than a target pressure, and the control valve closes and fluidically blocks communication between the tank and the flow line when the pressure on the flow line is greater than or substantially same as the target pressure.

Embodiment 11

The pump system of any of the preceding embodiments, further comprising a wheeled transportable surface arranged to carry the tank and the control valve, the accumulator assembly movable as a unit with respect to a remainder of the pump system on the transportable surface.

Embodiment 12

The pump system of any of the preceding embodiments, further comprising an accumulator assembly pump fluidically connected to the tank, wherein the accumulator assembly pump is arranged to pressurize the tank.

Embodiment 13

The pump system of any of the preceding embodiments, wherein the accumulator assembly pump is configured to connect to the blender as a fluid source to pressurize the tank.

Embodiment 14

The pump system of any of the preceding embodiments, further comprising an accumulator assembly pump fluidically connected to the tank, wherein the accumulator assembly pump is arranged at a discharge end of the tank, and disposed between the tank and the control valve.

Embodiment 15

The pump system of any of the preceding embodiments, wherein the blender includes a tub, a first pump at an inlet of the blender tub, and a second pump at an outlet of the blender tub, the second pump discharging fracturing fluid from the blender into the flow line.

Embodiment 16

The pump system of any of the preceding embodiments, further comprising a check valve on the flow line, the check valve positioned between the blender and the accumulator assembly, wherein fluid is blocked by the check valve from flowing back to the blender.

Embodiment 17

A method of protecting a fluid end of a fracturing pump from cavitation, the method comprising: transferring fluidic materials from a blender to a fracturing pump along a flow line; fluidically connecting an accumulator assembly to the flow line between the blender and the fracturing pump, the accumulator assembly including a pressurizable tank configured to contain pressurized fluid, and a control valve fluidically connected between a discharge end of the tank and the flow line; monitoring pressure on the flow line; opening the control valve to fluidically connect the tank to the flow line when a pressure on the flow line is less than a target pressure; and, closing the control valve to fluidically block communication between the tank and the flow line when the pressure on the flow line is greater than or substantially same as the target pressure.

Embodiment 18

The method of any of the preceding embodiments, further comprising pressurizing the tank using an accumulator assembly pump.

Embodiment 19

The method of any of the preceding embodiments, further comprising pressurizing the tank using fluid from the blender.

Embodiment 20

The method of any of the preceding embodiments, further comprising arranging the accumulator assembly on a transportable surface, and transporting the accumulator assembly to the well site prior to fluidically connecting the accumulator assembly to the flow line.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. An accumulator assembly for a pump system at a well site, the accumulator assembly arranged to fluidically connect to a flow line between a blender and a fracturing pump of the pump system, the accumulator assembly comprising:
    a pressurizable tank configured to contain pressurized fluid; and,
    a control valve fluidically connected between a discharge end of the tank and the flow line;
    an accumulator assembly pump fluidically connected to the tank, the accumulator assembly pump arranged at a discharge end of the tank, and disposed between the tank and the control valve;
    wherein the control valve opens and fluidically connects the tank to the flow line when a pressure on the flow line is less than a target pressure, and the control valve closes and fluidically blocks communication between the tank and the flow line when the pressure on the flow line is greater than or substantially the same as the target pressure.

2. The accumulator assembly of claim 1, further comprising a transportable surface arranged to carry the tank and the control valve together as a unit, the transportable surface with the tank and control valve arranged thereon movable with respect to a remainder of the pump system.

3. The accumulator assembly of claim 2, wherein the transportable surface is a trailer bed, and further comprising an engine to operate the accumulator assembly pump, the accumulator assembly pump and the engine additionally disposed on the trailer bed.

4. The accumulator assembly of claim 1, further comprising an engine to operate the accumulator assembly pump.

5. The accumulator assembly of claim 1, wherein the accumulator assembly pump is arranged to pressurize the tank.

6. The accumulator assembly of claim 5, wherein the accumulator assembly pump is configured to connect to the blender as a fluid source to pressurize the tank with the pressurized fluid.

7. The accumulator assembly of claim 1, further comprising a check valve between the control valve and the tank, wherein the check valve only permits flow in a direction from the tank to the control valve.

8. A pump system for use at a well site, the pump system comprising:
    a blender;
    a fracturing
    a flow line configured to transfer fluidic materials from the blender to the fracturing pump; and,
    an accumulator assembly arranged to fluidically connect to the flow line between the blender and the fracturing pump, the accumulator assembly comprising:
        a pressurizable tank configured to contain pressurized fluid; and,
        a control valve fluidically connected between a discharge end of the tank and the flow line;
    wherein the control valve opens and fluidically connects the tank to the flow line when a pressure on the flow line is less than a target pressure, and the control valve closes and fluidically blocks communication between the tank and the flow line when the pressure on the flow line is greater than or substantially the same as the target pressure, and the blender includes a blender tub, a first pump at an inlet of the blender tub, and a second pump at an outlet of the blender tub, the second pump discharging fracturing fluid from the blender into the flow line.

9. The pump system of claim 8, further comprising a wheeled transportable surface arranged to carry the tank and the control valve, the wheeled transportable surface with the tank and the control valve arranged thereon movable as a unit with respect to a remainder of the pump system.

10. The pump system of claim 8, further comprising an accumulator assembly pump fluidically connected to the tank, wherein the accumulator assembly pump is arranged to pressurize the tank.

11. The pump system of claim 10, wherein the accumulator assembly pump is configured to connect to the blender as a fluid source to pressurize the tank.

12. The pump system of claim 8, further comprising an accumulator assembly pump fluidically connected to the tank, wherein the accumulator assembly pump is arranged at a discharge end of the tank, and disposed between the tank and the control valve.

13. The pump system of claim 8, further comprising a check valve on the flow line, the check valve positioned between the blender and the accumulator assembly, wherein fluid is blocked by the check valve from flowing back to the blender.

14. A method of protecting a fluid end of a fracturing pump from cavitation, the method comprising:
    transferring fluidic materials from a blender to a fracturing pump along a flow line, a pump at a discharge end of the blender providing pressure to the fracturing pump along the flow line;
    fluidically connecting an accumulator assembly to the flow line between the blender and the fracturing pump, the accumulator assembly including a pressurizable tank configured to contain pressurized fluid, and a control valve fluidically connected between a discharge end of the tank and the flow line;
    monitoring the pressure on the flow line;
    opening the control valve to fluidically connect the tank to the flow line when the pressure on the flow line is less than a target pressure; and,
    closing the control valve to fluidically block communication between the tank and the flow line when the pressure on the flow line is greater than or substantially the same as the target pressure.

15. The method of claim 14, further comprising pressurizing the tank using an accumulator assembly pump.

16. The method of claim 14, further comprising pressurizing the tank using fluid from the blender.

17. The method of claim 14, further comprising arranging the accumulator assembly on a transportable surface, and transporting the accumulator assembly to the well site prior to fluidically connecting the accumulator assembly to the flow line.

18. The pump system of claim 8, wherein the transfer of fluidic materials from the blender to the fracturing pump bypasses the accumulator assembly when the pressure on the flow line from the blender to the fracturing pump is greater than or substantially the same as the target pressure.

19. The method of claim 14, wherein, when the control valve is closed, fluidic materials are passed from the blender to the frac pump at a pressure greater than or substantially the same as the target pressure, and, when the control valve is opened, the tank supplies fluid to the flow line until the target pressure on the flow line is reached.

20. The method of claim 14, wherein the fluidic materials transferred from the blender to the fracturing pump include proppant.

* * * * *